United States Patent [19]
Flolo

[11] Patent Number: 6,146,064
[45] Date of Patent: *Nov. 14, 2000

[54] CUTTING INSERT WITH IMPROVED CHIP CONTROL

[75] Inventor: Dennis P. Flolo, Friendswood, Tex.

[73] Assignee: Tool Flo Manufacturing, Inc., Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/228,854

[22] Filed: Jan. 12, 1999

[51] Int. Cl.[7] ............................................... B23B 27/22
[52] U.S. Cl. ............................ 407/114; 407/115; 407/116
[58] Field of Search ................................. 407/114, 115, 407/116, 117

[56] References Cited

U.S. PATENT DOCUMENTS

| | | |
|---|---|---|
| 3,754,309 | 8/1973 | Jones et al. . |
| 4,116,576 | 9/1978 | Gawryk, Sr. et al. . |
| 4,583,887 | 4/1986 | Wertheimer ............................ 407/116 |
| 4,963,060 | 10/1990 | Niebauer et al. . |
| 5,040,930 | 8/1991 | Zinner ................................. 407/117 X |
| 5,375,948 | 12/1994 | Lindstedt ............................. 407/117 X |
| 5,423,639 | 6/1995 | Wiman ..................................... 407/116 |
| 5,704,737 | 1/1998 | Alford .................................. 407/116 X |
| 5,725,334 | 3/1998 | Paya ..................................... 407/116 X |

OTHER PUBLICATIONS

"ISCAR Plus Line" Catalog, 1996, Cover Page and pp. 64–65.

*Primary Examiner*—Henry W. H. Tsai
*Attorney, Agent, or Firm*—Browning Bushman

[57] ABSTRACT

The cutting insert 10 for removing metal from a workpiece includes an insert body 12 having a left-side wall 24, right-side wall 26, a top surface 28 defining a notch 16, a bottom surface 30 and an end region 20 defining a front cutting edge 60. A land region 42 includes a front land portion 44, a left-side land portion 45, and a right-side land portion 46 which together define a periphery of a chip control pocket 40. The chip control pocket 40 includes a front descending wall 47 and a rear ascending wall 48, a left-side descending wall 50 and a right-side descending wall 52. Each of the walls of the chip control pocket preferably has a curvilinear configuration. A protuberance 54 is spaced between the left-side descending wall and the right-side descending wall, and has an elongate top surface 56 spaced along a protuberance axis 66 preferably perpendicular to the front cutting edge 60. The protuberance also has a left-side surface 67 and a right-side surface 68 each sloping downward toward a left-side descending wall and a right-side descending wall, respectively.

20 Claims, 2 Drawing Sheets

CUTTING INSERT WITH IMPROVED CHIP CONTROL

FIELD OF THE INVENTION

The present invention relates to cutting inserts useful in metal working, and specifically to a cutting insert with improved chip control. More particularly, the invention relates to an improved cutting insert intended to be detachably clamped to a holder, with the insert intended to be discarded when the cutting edges become dull or chipped.

BACKGROUND OF THE INVENTION

Machining operations involve the removal of metal from the surface of a rotating work piece by a cutting tool which generates a chip during the machining process. The chip preferably breaks to prevent long chip strings from engaging the rotating workpiece. Long chip strings are also more difficult to handle and consume more space than the equivalent length of short chips. A good deal of attention accordingly is paid by those skilled in the art to the formation of the chip during the machining process. Also, a significant amount of energy may be consumed in the movement of the chip away from the cutting tool, and in the technique for repeatedly breaking the chip to prevent long chips from being formed.

A discontinuous chip has a relatively short length before it breaks off from another chip during the machining process, and is desirable since the discontinuous chip may be easily cleared away from the cutting tool. While some metals and alloys easily generate discontinuous chips during metal cutting operation, other metals and alloys produce chips which do not readily break off, and in those cases machinists prefer a cutting tool with enhanced chip control features. Without an effective chip control mechanism, chips resulting from some metal working operations may form a curl, but the chip length undesirably continues in this curled manner without the chip breaking. These long chips often may not be easily removed from the area of the rotating workpiece. Safety regulations are increasingly requiring that long chips not be formed by machining operations to prevent injury to operators from shavings being whipped around when they get caught on the rotating chuck or workpiece. Long or continuous cutting chips are also more difficult to handle and transport to a metal reclamation site than short discontinuous chips. Cutting inserts with chip control features are disclosed in U.S. Pat. Nos. 4,116,576 and 4,963,060.

Cutting inserts are commonly used in machining operations wherein the cutting insert is intended to be discarded when the cutting edges become dull and chipped. A common type of cutting insert is detachably clamped to a tool holder and is indexable or invertible. The insert thus has at least two primary cutting edges, such that once one cutting edge is worn the tool may be inverted and the other cutting edge used before the insert is discarded.

One of the problems with a conventional cutting insert having a chip control pocket is that the chip tends to scrap a side wall of a chip control pocket as it travels into and/or out of the pocket. This allows the chip to get "hung-up" in the pocket so that a subsequently formed chip is prevented from cleanly entering and/or exiting the pocket. Another problem with cutting inserts with conventional chip control features is that the chip control pocket generates a large amount of heat, which decreases the useful life of the insert. Accordingly, a cutting insert with an improved chip control mechanism is desired by those skilled in metal machining operations, particularly if the cutting insert can be manufactured at an economical price compared to conventional cutting inserts. Those skilled in the art have thus long desired a cutting insert with chip control features which will reliably result in discontinuous chips, and wherein the discontinuous chips smoothly pass into and out of the chip control pocket without generating excessive heat.

The disadvantages of the prior art are overcome by the present invention. An improved cutting insert is hereinafter disclosed which desirably results in discontinuous chips. The cutting insert of the present invention is well suited for use in machining operations which otherwise would tend to produce continuous chips, or which would not reliably produce discontinuous chips, or which would produce discontinuous chips but would also result in poor life of the cutting insert.

SUMMARY OF THE INVENTION

A cutting insert includes a chip control pocket adjacent a front cutting edge in the end region of the cutting insert body. The chip control pocket includes a front descending wall, and left-side descending wall, and a right-side descending wall. A protuberance is spaced between the left-side descending wall and the right-side descending wall, with the protuberance having an elongate top surface which defines a raised portion spaced between the front cutting edge and a protuberance base perimeter. The protuberance also has a left-side surface and a right-side surface each sloping downwardly from the raised portion toward a lower end of the left-side descending wall and right-side descending wall, respectively.

In one embodiment of the invention, the protuberance has the general shape of a football split lengthwise. The protuberance extends upward (toward the front cutting edge) from the generally elliptical-shaped base perimeter of the protuberance. The raised portion of the protuberance defines a protuberance axis generally perpendicular to the front cutting edge. In this embodiment, the front descending wall, the right-side descending wall, and the left-side descending wall may each have a curvilinear configuration to prevent the chip from engaging straight edges in the chip control pocket formed by the intersection of planar surfaces. The curved surfaces in the chip control pocket enhance the smooth flow of the chip into and out of the pocket.

In a preferred embodiment of the invention, the insert body has a left-side wall, a right-side wall, a top surface and a bottom surface each defining a notch therein, and a pair of end regions each defining a front cutting edge. A land region extends inward from each respective front cutting edge toward the respective notch, with a land region including a front land portion adjoining the front cutting edge, a left-side land portion adjoining an end region left-side wall, and a right-side land region adjoining a land region right-side wall.

During use of the cutting insert, the protuberance in the chip control pocket forms an elongate crease generally in the center of the chip, thereby reducing the width of the chip. The reduced width chip does not have a tendency to get caught between the side walls of the pocket, and the center crease in the chip contributes to the reliable formation of discontinuous chips. By shrinking the width of the chip while it is in the chip control pocket, problems associated with the chip scarring the sidewalls of the pocket are avoided.

The protuberance also tends to smoothly curl the chip up out of the pocket. A curved front descending wall and a curved rear ascending wall in the chip control pocket allow for free flow of the chip or shaving out of the pocket, which decreases the energy consumed by the machining operation and the generated heat, thereby improving the life of the cutting insert. The front-to-back length of the chip control pocket may be increased over prior art designs to provide ample space to create a curl in the chip. A left-side cutting edge and/or a right-side cutting edge adjacent the left-side land portion and right-side land portion, respectively, may be provided on the end region of the insert body for profiling operations.

It is an object of the present invention to provide a cutting insert having a chip control pocket in an end region of the insert body, with the chip control pocket having a front descending wall extending from a front land, a left-side descending wall, a right-side descending wall, and a protuberance spaced between the left-side descending wall and right-side descending wall and having an elongate top surface defining a raised portion spaced between the front cutting edge and a protuberance base perimeter protuberance. A protuberance left-side surface and a protuberance right-side surface each slope downward from the raised portion toward the protuberance base perimeter.

A related object of the this invention is to provide a cutting insert with a chip control pocket having a protuberance therein for forming a crease along the length of the chip and thereby shrinking the width of the chip. The reduced width chip flows smoothly out of the chip control pocket and the crease tends to reliably form a discontinuous chip.

Still another object of the present invention is to enhance the life of a cutting insert by reducing the heat generated during flow of a chip into and out of the chip control pocket.

It is a feature of the present invention that the raised portion of the protuberance in the chip control pocket has a protuberance axis generally perpendicular to the front cutting edge. The protuberance may also include a curvilinear left-side wall and a curvilinear right-side wall.

Another feature of this invention is that the chip control pocket has few if any straight edges which tend to increase the likelihood of the chip getting hung up within the chip control pocket. Accordingly, a front descending wall, a left-side descending wall, a right-side descending wall, and a rear ascending wall of the chip control pocket each define a curvilinear surface to enhance the smooth flow of the chip out of the chip control pocket.

Yet another feature of the invention is that the end region in the insert body may include a right-side cutting edge and/or a left-side cutting edge, such that the cutting insert may be used in a profiling operation.

It is also a feature of the present invention that the cutting insert includes improved chip control features which form desired discontinuous chips during machining operations performed on a wide variety of metals and during various metal cutting conditions.

Still another feature of this invention is a chip control pocket having a relatively long spacing between a top portion of a front descending wall and a top portion of a rear ascending wall of the chip control pocket, thereby providing ample space for the chip to curl.

Yet another feature of the present invention is that a base perimeter of a protuberance has a general elliptical configuration.

It is a significant advantage of the invention that the cutting insert is provided with an improved chip control mechanism without significantly increasing the cost of the cuttinginsert.

Still another advantage of this invention is that the cutting insert may be provided with a pair of opposing end regions each defining a front cutting edge, with both the top surface and the bottom surface of the insert body including a notch therein for attachment on the cutting insert to a tool holder. The insert body may be inverted about an axis perpendicular to a right-side wall, so that each of the front cutting edges may be used in machining operations before the insert is discarded.

These and further objects, features, and advantages of the present invention will become apparent from the following detailed description, wherein reference is made to the figures in the accompanying drawings.

DETAILED DESCRIPTION OF PREFERRED EMBODIMENTS

Figure 1:
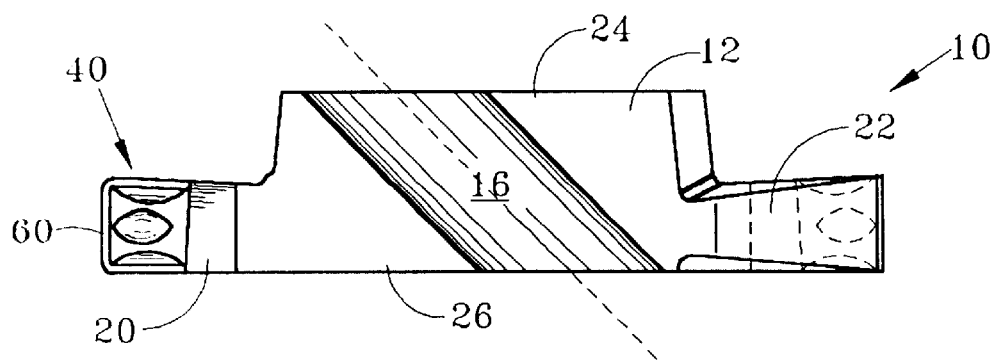
FIG. 1 is a top view of one embodiment of a cutting insert in accordance with the present invention.
Figure 2:
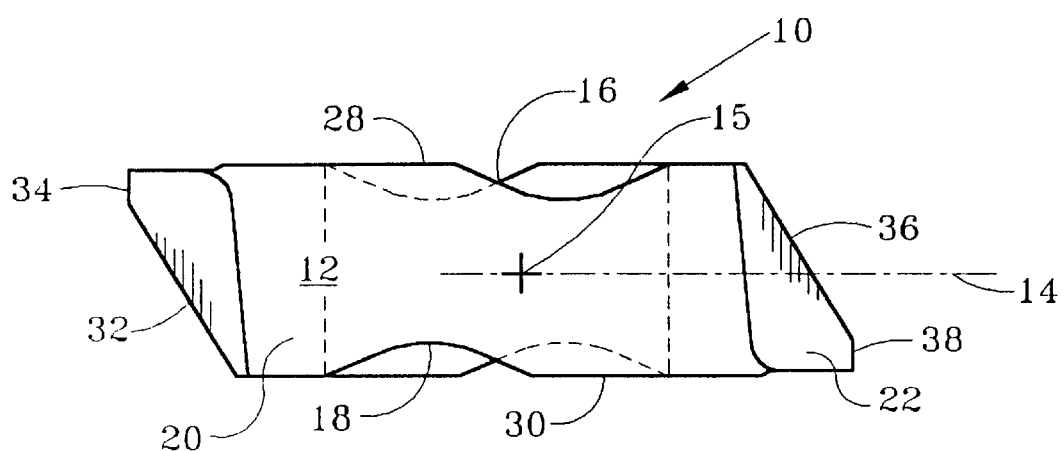
FIG. 2 is a side view of the cutting insert shown in FIG. 1.

FIGS. 1 and 2 depict a preferred embodiment of a cutting insert 10 in accordance with the present invention. The insert body 12 includes a tapered notch or groove 16 in the top surface 28. A similar groove 18 is provided in the bottom surface 30. The insert body first end region 20 is thus a mirror image of the opposing second end region 22. The insert body further includes a left-side end wall 24 and a right-side end wall 26. The cutting insert includes an insert body 12 which has a front-to-back centerline 14 and an invertible axis 15. Those skilled in the art will appreciate that the insert body may be inverted about axis 15 (see FIG. 2) so that the top surface as shown in FIG. 2 becomes the bottom surface and the bottom surface then becomes the top surface. Axis 15 is generally perpendicular to both the right-side surface 26 and the left-side surface 24 of the insert body. During this inversion, the end region 22 then effectively becomes the end region 20, and the end region 20 similarly becomes the end region 22. It should be understood that these end regions otherwise are identical in construction, and accordingly only the end region 20 is discussed in further detail below.

The top surface 28 and the bottom surface 30 of the insert body are each generally perpendicular to both the right side end wall 26 and the left-side surface end wall 24. When using the cutting insert 10 to cut metal with the front cutting edge 60 on the first end region 20, the end wall 34 of the end region 20 (see FIG. 2) is the front of the cutting insert.

The diagonal groove 16 in the top surface 28 of the insert body may have a generally v-shaped or u-shaped cross-sectional configuration, and is adapted for engagement with a conventional tool holder assembly (not shown) to position the end region 20 at a predetermined location relative to the tool holder. The notch or groove 16 thus extends across the top surface 28 of the insert body at an angle such that the insert body will be precisely positioned relative to the tool holder. The insert is thus fixedly clamped to the tool holder such that the notch or groove 16 accurately locates the insert with respect to the tool holder. A suitable tool holder for positioning the insert 10 in accordance with the present invention for a machining operation is disclosed in U.S. Pat. No. 4,963,060.

Figure 3:
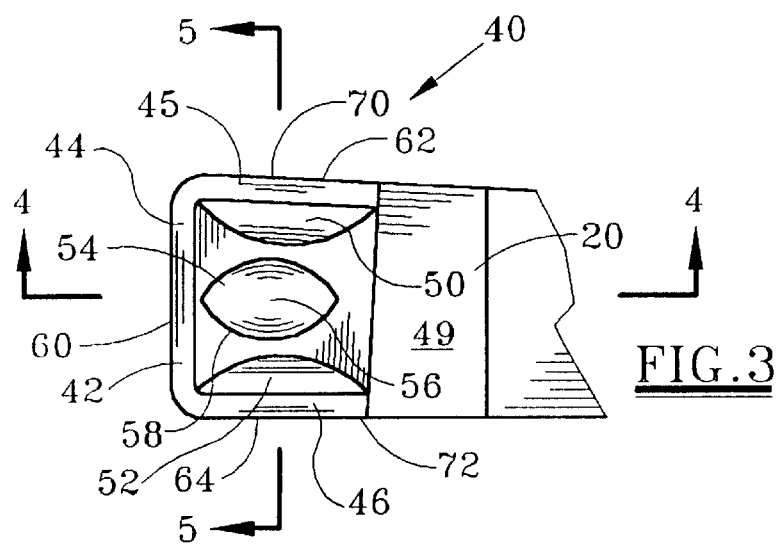
FIG. 3 is an enlarged top view of the chip control pocket generally shown in FIG. 1.

As shown in FIGS. 2 and 3, the insert body includes a generally triangular-shaped end region 20 which includes a chip control pocket 40 in the upper surface thereof A lower tapered wall 32 of the end region 20 extends from the bottom surface 30 to the end surface 34. In one embodiment, the end surface 34 may be substantially perpendicular to the top surface 28. The opposing end region 22 thus has a similar tapered surface 36 and a similar end surface 38.

As shown in FIG. 3, the top surface of the end region 20 includes a land region 42 which extends inwardly from a front cutting edge 60 toward the notch 16. The land region 42 includes a front land portion 44, a left-side land portion 45, and a right-side land portion 46. The intersection of the front land portion 44 and the end surface 34 thus forms the front cutting edge 60 on the end region 20. The combined u-shaped land portions define a periphery of the chip control pocket 40 in the end region 20. The front cutting edge 60 is the primary cutting edge of the end region 20. The intersection of the left-side land portion 45 and a left-side wall 70 of the end region 20 forms a left-side cutting edge 62. Similarly, the intersection of the right-side land region 46 with a right-side wall 72 of the end region 20 forms a right-side cutting edge 64. Both the left-side cutting edge 62 and the right-side cutting edge 64 may be used for a machining operation generally referred to as profiling. During a profiling operation, large quantities of metal typically are not removed, and profiling operations instead are commonly used to finish surfaces of a machined component. The land region 42 strengthens the cutting edges and provides support for the cutting edges to enhance the life of the cutting insert.

Figure 4:
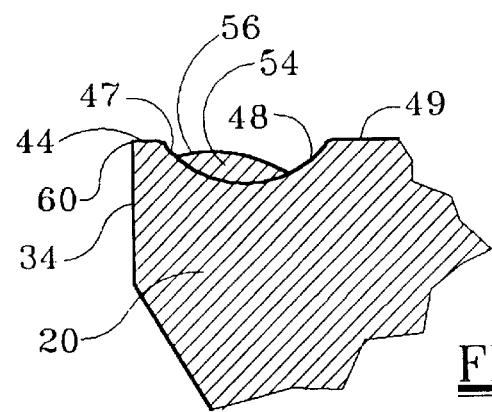
FIG. 4 is a cross-sectional view through the chip control pocket taken along lines 4—4 in FIG. 3.

As shown on FIG. 4, the chip control pocket 40 includes a front descending wall 47 and a rear ascending wall 48, which together form a generally bowl-shaped configuration. The front land portion 44 thus extends to the front descending wall 47, and the rear ascending wall 48 extends to the rearward top surface 49 of the end region 20. The chip control pocket 40 thus has a front descending wall 47 which defines a curvilinear front surface within a plane perpendicular to both the cutting edge 60 and the top surface 28, with this plane preferably being parallel to a right-side wall 26. The rearward top surface 49 is opposite the front land portion 44 with respect to the chip control pocket, and may but need not be at the same vertical elevation as the front land region 44. Also, it should be understood that both the front land region 44 and the end surface 34 may have a slight taper so that the cutting edge 60 is the forwardmost and uppermost portion of these surfaces i.e., the land region 44 has a positive rake angle and the end surface 34 has a positive relief angle. The left-side land portion and the right-side land portion also may be inclined slightly downwardly in a direction from the respective cutting edge toward the chip control pocket 40. The chip control pocket 40 is substantially symmetrical about a centerline between the cutting edges 62 and 64.

Figure 5:
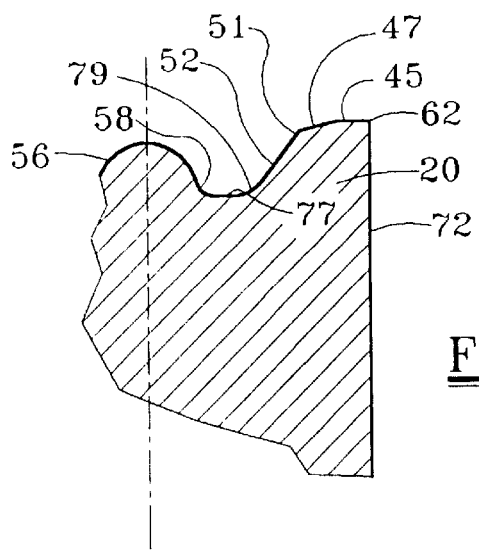
FIG. 5 is a cross-sectional view through the chip control pocket taken along lines 5—5 in FIG. 3.

The left-side land portion 45 extends from the left-side wall 70 to a left-side descending wall 50 of the chip control pocket, and the right-side land region 46 similarly extends from the right-side wall 72 to a right-side descending wall 52 of the chip control pocket. Referring to FIGS. 3 and 5, the lower end 49 of each of the left-side descending wall and right-side descending wall may define a surface which is curvilinear within a plane parallel to the cutting edge 60, with this plane also being perpendicular to both the top surface 28 and the right-side wall 26 of the insert body. The upper end 51 of each descending wall 50 and 52 may be a planar surface angled at from 45° to 55° with respect to a horizontal plane parallel to the top surface 2. FIG. 5 also illustrates that either or both of the land regions 45 and 46 my include a planar surface 77 which is tapered slightly downwardly toward the respective descending wall 50, 52.

The right-side cutting edge 64 is thus adjoining the right-side land portion 46, and is substantially perpendicular to the front cutting edge 60. The left-side cutting edge 62 similarly adjoins the left-side land region 45, and is also substantially perpendicular to the front cutting edge 60. In one embodiment, the cutting edge 62 is tapered slightly toward the opposing cutting edge 64 in a direction from the front cutting edge 60 and toward the groove 16.

Referring again to FIG. 3, the chip control mechanism of the present invention includes a protuberance 54 which is spaced between the left-side descending wall 50 and the right-side descending wall 52 of the chip control pocket. Referring to FIGS. 3 and 5, the protuberance 54 has an elongate top surface 56 which defines a raised portion spaced between the front cutting edge and a base perimeter 58 of the protuberance. As shown in FIG. 3, the protuberance has, in a top view, a general elliptical configuration defined by its base perimeter. The raised portion 56 of the protuberance elongate top surface has a curved protuberance centerline which is spaced above the front-to-back protuberance axis 66 (see FIG. 6), which in turn is perpendicular to the cutting edge 60. Accordingly, the axis 66 in the depicted embodiment is generally parallel with the right-side wall 26. Protuberance 54 also has a left-side wall 67 and a right-side wall 68 which each define a curvilinear surface within a plane parallel to the cutting edge 60. For the depicted embodiment, this plane is thus perpendicular to both the top surface 28 and the right-side wall 26. As shown in FIG. 4, at least a portion of the base perimeter 58 of the protuberance 54 intersects the front descending wall 47, and another portion of the base perimeter of the protuberance intersects the rear ascending wall 48. The protuberance is shifted, however, toward the front land portion 44, and accordingly a majority of the protuberance 54 extends upward from the front descending wall 47 and a minority of the protuberance extends upwards from the rear ascending wall 48.

Figure 6:
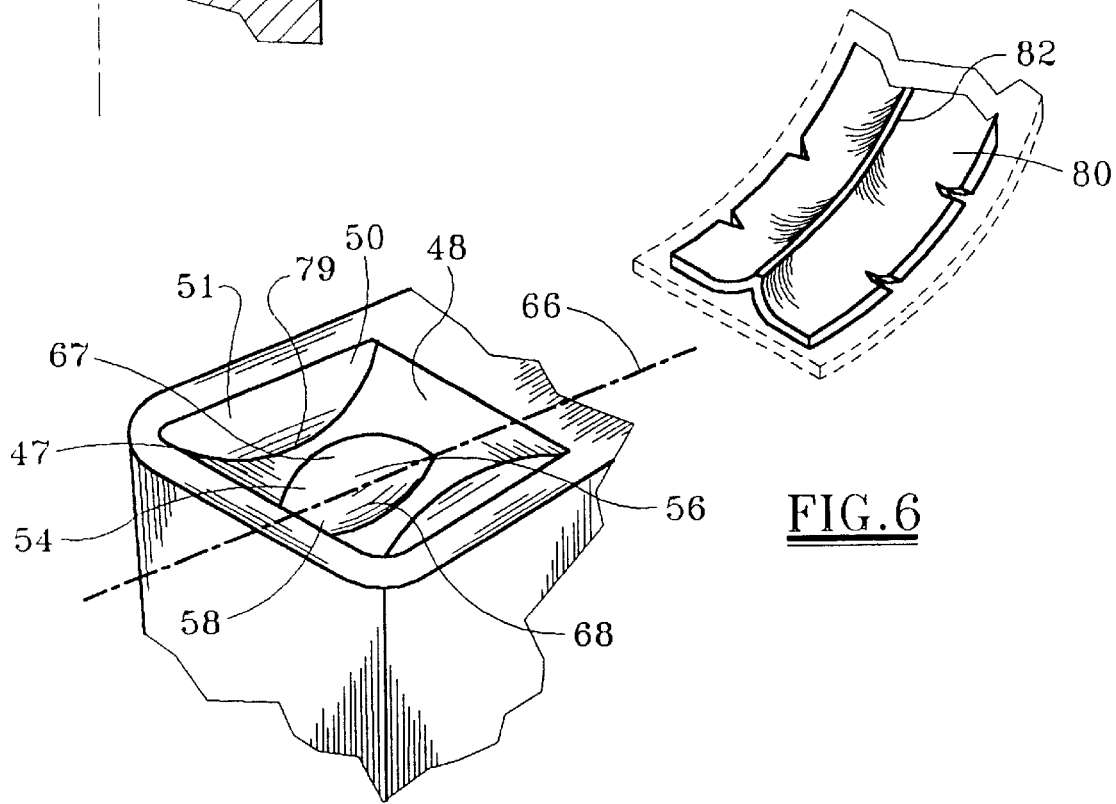
FIG. 6 is an isometric view of the chip control pocket shown in FIG. 3.

Referring to FIG. 6, the protuberance left-side surface 67 and the protuberance right-side surface 68 each slope downward from the raised portion 56 and toward the lower curved end 79 of the left-side descending wall and the right-side descending wall, respectively. In a preferred embodiment, this lower curved end 49 of each of the left-side and right-side descending wall intersects both the front descending wall 47 and the rear ascending wall 48. Accordingly, a portion of the front-to-back bowl shaped surface as shown in FIGS. 3 and 6 is spaced between the perimeter 58 of the protuberance 54 and both the left-side descending wall 50 and the right-side descending wall 52. The protuberance left-side wall 67 and the protuberance right-side wall 68 each also define a curvilinear surface within a horizontal plane parallel to the cutting edge 60, with this plane being parallel to the top surface 28 and perpendicular the right-side wall 26 of the depicted embodiment. Both the left-side wall 67 and the right-side wall 68 may thus be curved downwardly and also curved front-to-back of the protuberance.

In a preferred embodiment of the invention, the front descending wall 47 and the rear ascending wall 48 each have a substantially uniform radius, and this radius being approximately 10% of the length of the cutting edge 60. The protuberance 54 is positioned centrally between the left-side descending wall and right-side descending wall, and during formation of the chip the protuberance forms a central crease along the length of the chip to shrink the width of the chip and reduce the likelihood of the chip scraping the side walls of the chip control pocket. By providing a chip control pocket with contoured surfaces rather than planar end surfaces, the likelihood of a chip abruptly engaging a straight edge formed by intersecting planar surfaces is decreased. This feature increases the tool life due to reduced heat generation, and also contributes to the smooth flow of the chip into and out of the chip control pocket.

Referring to FIG. 6, the protuberance 54 thus folds the chip or shaving 80 formed when the cutting insert front cutting edge 60 cuts the metal. The elongate crease 82 in the discontinuous chip 80 shown in FIG. 6 thus slightly folds the chip so its width is reduced compared to a conventional chip, which is shown in dashed lines. The width reduction resulting from this chip crease need only be slight to have a significant benefit, and typically a chip with a crease would have a width of from 85% to 95% of a chip without a crease. The protuberance 54 thus substantially enhances the reliability of the chip uniformly coming out of the chip control pocket without binding in the chip control pocket. Problems associated with the chip scraping or scarring the side walls of the chip control pocket are thus significantly minimized or entirely avoided by shrinking the width of the chip before it comes out of the pocket. The crease 82 formed along the center of the chip also increases the likelihood that discontinuous chips will be formed using the cutting insert of the present invention.

The length of the chip control pocket between the front land region 44 and the rearward top surface 49 as shown in FIG. 4 is increased over most prior art cutting inserts to provide ample space for the chip to curl out of the chip control pocket. More specifically, the length of the chip control pocket between a rearward end of the front land region 44 and a front edge of the rearward top surface 49 is preferably in excess of 55% of the length of the cutting edge 60, and for currently preferred embodiments is in excess of 60% and typically is from 60% to 70% of the length of the front cutting edge 60.

In a currently preferred embodiment of the invention, the lower end of the left-side wall 67 and the right-side wall 68 of the protuberance 54 are each curvilinear in two perpendicular directions, i.e., within a horizontal plane and within a vertical plane, as discussed above. In another embodiment, however, the sides of the protuberance may each form a curve in a horizontal plane, and a vertical plane be parallel with the front cutting edge 60 and intersect the sides of the protuberance to result in an inverted V-shaped protuberance cross-section for the outer surface. For this embodiment, the curved sides of the protuberance could thus extend to a protuberance center having a relatively sharp top edge. One disadvantage of this embodiment is that this sharp edge may tend to split the chip so that the chip undesirably divides into a left-side chip half and a right-side chip half Also, this sharp protuberance top edge may tend to dull, thus leading to non-uniform performance of the cutting insert. In still another embodiment, both the left-side wall and the right-side wall of a protuberance could each have a pair of front planar surfaces and a pair of rear planar surface, with each of these surfaces being angled toward each other at the extreme front and rear ends of the protuberance. These planar surfaces may intersect to form a sharp top protuberance edge, as discussed above, although the problem created by this top sharp edge could be alleviated by rounding the top surface of the protuberance. Even for these less preferred embodiments wherein the protuberance sides have planar configurations, a straight edge preferred is not formed within the pocket 40, since the protuberance side may intersect the front descending wall and the rear ascending wall which may each be curvilinear.

For a preferred embodiment of the invention, both the left-side wall 67 and the right-side wall 68 of the protuberance are each curved from the front of the protuberance to the back of the protuberance, and from the uppermost surface of the protuberance to the base perimeter of the protuberance is also curved, as explained above. The radius of curvature for each of these side walls from the front to the back may be in the range of from 0.040 inches to 0.060 inch. Alternatively expressed, the front-to-back radius may be from 38% to 48% of the length of the cutting edge 60. The top-to-bottom radius for the sides of the protuberance may be in the range of 0.035 inches to 0.055 inches, or alternatively expressed may be from 35% to 45% of the length of the cutting edge 60.

The insert body 12 is preferably made from a hard material conventionally used to form cutting inserts, such as tungsten or titanium carbide.

The preferred embodiment invention, as disclosed herein, utilizes a cutting insert which is invertible, so that the cutting insert essentially has two different front cutting edges. Once one cutting edge is worn or chipped, the tool is then inverted so that the cutting edge on the opposing end region becomes the useful cutting edge. The concept of the present invention could be applied, however, to an insert with a single cutting edge. Also a preferred embodiment of the invention as disclosed herein includes both a left-side cutting edge and a right-side cutting edge on each end region, with these cutting edges being useful for profiling operations. When these cutting edges are provided, a left-side land region and a right-side land region are accordingly provided adjacent each of these cutting edges. In another embodiment of the cutting tool, these side cutting edges for profiling operations may not be utilized. Nevertheless, cutting insert still preferably includes a left-side descending wall and a right-side descending wall as disclosed herein to form the chip control pocket, so that the chip goes into the front of the pocket and comes out the back of the pocket. The upper end of each of these side walls of the chip control pocket may extend into the top surface of the end region, although in this case each top surface would then not form a cutting edge with a corresponding side wall of the end region.

Various modifications could be made to the cutting insert as disclosed herein while still employing the concepts of the present invention. For example, the cutting insert may be indexable rather than invertible, and thus have multiple cutting edges and corresponding chip control pockets, with each cutting edge being indexed to the useable cutting edge once the preceding cutting edge has been worn or chipped. Also, the land region could have an L-shaped configuration rather than a U-shaped configuration, with only a front cutting edge and one side cutting edge provided for a profiling operation.

Various additional modifications to the present invention should be apparent from the above description. Although the present invention has been described in detail for a preferred embodiment, it should be understood this explanation is for illustration only and the invention is not limited to a preferred embodiment or to the other embodiments described herein. Alternative components and operating techniques should be apparent to those skilled in the art in view of this disclosure. Such modifications are thus contemplated and may be made without departing from the spirit of the invention, which is defined by the claims.

What is claimed is:

1. A cutting insert for removing metal from a workpiece, the cutting insert comprising:

an insert body having a left-side wall, a right-side wall, a top surface defining a notch therein, a bottom surface, and an end region defining a front cutting edge;

a land region extending inward from the front cutting edge toward the notch, the land region having a positive rake angle and including a front land portion adjoining the front cutting edge, a left-side land portion adjoining an end region left-side wall, and a right-side land portion adjoining an end region right-side wall, the front land portion, the left-side land portion, and right-side land portion defining a periphery of a chip control pocket in the end region a front descending wall of the chip control pocket extending downward from the front land portion, a left-side descending wall of the chip control pocket extending downward from the left-side land portion to a left-side wall lower end, and a right-side descending wall of the chip control pocket extending downward from the right-side land portion to a right-side wall lower end; and a protuberance spaced between the left-side descending wall and the right-side descending wall of the chip control pocket, the protuberance having an elongate top surface defining a raised portion spaced vertically between the front cutting edge and a base perimeter of the protuberance, a protuberance left-side surface and a protuberance right-side surface each sloping downward from the raised portion toward the protuberance base perimeter and toward the left-side wall lower end and the rightside wall lower end, respectively, each protuberance left-side and right-side surface being a curvilinear surface within both a vertical plane perpendicular to the front cutting edge and a vertical plane parallel to the front cutting edge.

2. The cutting insert as defined in claim 1, wherein the raised portion of the protuberance elongate top surface defines a protuberance axis generally perpendicular to the front cutting edge.

3. The cutting insert as defined in claim 1, wherein the protuberance base perimeter has a generally elliptical configuration.

4. The cutting insert as defined in claim 1, further comprising:

the chip control pocket front descending wall defining a curvilinear front surface within a plane perpendicular to the top surface and perpendicular to the front cutting edge.

5. The cutting insert as defined in claim 4, wherein the front descending wall and rear ascending wall of the chip control pocket have a combined generally bowl-shaped configuration.

6. The cutting insert as defined in claim 4, wherein at least a portion of the protuberance base perimeter intersects the curvilinear front surface of the front descending wall.

7. The cutting insert as defined in claim 6, wherein at least a portion of the protuberance base perimeter intersects the rear ascending wall.

8. The cutting insert as defined in claim 1, further comprising:

the chip control pocket left-side descending wall and the chip control pocket right-side descending wall each defining a left-side and a right-side surface, respectively, each curvilinear within a plane perpendicular to the top surface and parallel to the front cutting edge.

9. The cutting insert as defined in claim 1, wherein the insert body is invertible about an axis parallel to the front cutting edge, such that the insert body includes another end region defining another front cutting edge.

10. The cutting insert as defined in claim 1, wherein the top surface and bottom surface of the insert body are each generally perpendicular to the right-side wall of the insert body.

11. The cutting insert as defined in claim 1, further comprising:

a right side cutting edge adjoining the right-side land portion, the right-side cutting edge being substantially perpendicular to the front cutting edge.

12. The cutting insert as defined in claim 1, further comprising:

a left-side cutting edge adjoining the left-side land region, the left-side cutting edge being substantially perpendicular to the front cutting edge.

13. A cutting insert for removing metal from a workpiece while forming a cutting chip, the cutting insert comprising:

an insert body having a left-side wall, a right-side wall, a top surface defining a notch therein, a bottom surface, and an end region defining a front cutting edge and a chip control pocket;

a land region extending inward from the front cutting edge, the land region having a positive rake angle and including a front land portion adjoining the front cutting edge;

the chip control pocket having a front descending wall, a left-side descending wall, and a right-side descending wall; and a protuberance spaced between the left-side descending wall and the right-side descending wall of the chip control pocket for forming a crease along a length of the cutting chip formed by the front cutting edge, the protuberance having an elongate top surface defining a raised portion spaced vertically between the front cutting edge and a base perimeter of the protuberance and defining a protuberance axis generally perpendicular the front cutting edge, the protuberance having a protuberance base perimeter intersecting the front descending wall, and a protuberance left-side surface and a protuberance right-side surface each sloping downward from the raised portion toward the protuberance base perimeter, each protuberance left-side and right-side surface being a curvilinear surface within both a vertical plane perpendicular to the front cutting edge and a vertical plane parallel to the front cutting edge.

14. The cutting insert as defined in claim 13, further comprising:

the chip control pocket front descending wall defining a curvilinear front surface.

15. The cutting insert as defined in claim 13, further comprising:

the chip control pocket left-side descending wall and the chip control pocket right-side descending wall each defining a left-side curvilinear surface and a right-side curvilinear surface, respectively.

16. An invertible cutting insert for removing metal from a workpiece while forming a cutting chip, the cutting insert comprising:

an insert body having a left-side wall, a right-side wall, a top surface defining a top notch therein, a bottom surface defining a bottom notch therein, and a first end region and an opposing second end region each defining a front cutting edge, the top surface and bottom surface of the insert body each being generally perpendicular to the right-side wall of the insert body;

a land region extending inward from a respective front cutting edge toward a respective notch, the land region having a positive rake angle and including a front land portion adjoining the front cutting edge, a left-side land portion adjoining an end region left-side wall, and a right-side land portion adjoining an end region right-side wall, the front land portion, the left-side land portion, and right-side land portion defining a periphery of a chip control pocket in the end region;

a front descending wall of the chip control pocket extending downward from the front land portion, a left-side descending wall of the chip control pocket extending downward from the left-side land portion to a left-side wall lower end, and a right-side descending wall of the chip control pocket extending downward from the right-side land portion to a right-side wall lower end, the front descending wall and a rear ascending wall of the chip control pocket having a bowl-shaped cross-sectional configuration; and a protuberance spaced between the left-side descending wall and the right-side descending wall of the chip control pocket for forming a crease along a length of the cutting chip formed by the front cutting edge, the protuberance having an elongate top surface defining a vertically raised portion defining a protuberance axis generally perpendicular to the front cutting edge, the protuberance having a protuberance base perimeter intersecting both the front descending wall and the rear ascending wall, a protuberance left-side surface and a protuberance right-side surface each sloping downward from the raised portion toward the protuberance base perimeter and toward the left-side wall lower end and the right-side wall lower end, respectively, each protuberance left-side and right-side surface being a curvilinear surface within both a vertical plane perpendicular to the front cutting edge and a vertical plane parallel to the front cutting edge.

17. The cutting insert as defined in claim 16, wherein the lower end of each of the protuberance left-side wall and protuberance right-side wall is a curvilinear surface within a plane perpendicular to the top surface and parallel to the front cutting edge.

18. The cutting insert as defined in claim 16, further comprising:

the chip control pocket left-side descending wall and the chip control pocket right-side descending wall each defining a left-side curvilinear surface and a right-side curvilinear surface, respectively.

19. The cutting insert as defined in claim 13, wherein the protuberance base perimeter has a generally elliptical configuration.

20. The invertible cutting insert as defined in claim 16, wherein the protuberance base perimeter has a generally elliptical configuration.

* * * * *